United States Patent [19]

Salter, Jr. et al.

[11] Patent Number: 4,772,137

[45] Date of Patent: Sep. 20, 1988

[54] OIL FILM BEARING AND BUSHING

[75] Inventors: Lowell S. Salter, Jr., Shrewsbury; Thomas E. Simmons, Westford; Charles L. Innis, Jr., Paxton, all of Mass.

[73] Assignee: Morgan Construction Company, Worcester, Mass.

[21] Appl. No.: 31,422

[22] Filed: Mar. 30, 1987

[51] Int. Cl.$^4$ ............................................. F16C 17/02
[52] U.S. Cl. .................................... 384/120; 384/118
[58] Field of Search ............... 384/120, 118, 291, 111, 384/119

[56] References Cited

U.S. PATENT DOCUMENTS

| | | |
|---|---|---|
| 3,076,524 | 2/1963 | Avallone et al. |
| 3,726,573 | 4/1973 | Unno ................................. 384/120 |
| 4,567,815 | 2/1986 | Kocher ............................... 384/291 |

Primary Examiner—Lenard A. Footland
Attorney, Agent, or Firm—Samuels, Gauthier, Stevens & Kehoe

[57] ABSTRACT

An oil film bearing for rotatably supporting the journal surface of a rolling mill roll neck on a hydrodynamically maintained oil film. The bearing includes a bushing adapted to interrupt the load carrying continuity of the oil film and to subdivide the load zone into compound pressure zones.

15 Claims, 4 Drawing Sheets

OIL FILM BEARING AND BUSHING

BACKGROUND OF THE INVENTION

1. Field of the Invention

This invention relates to an improvement in oil film bearings of the type employed to rotatably support the journal surfaces of roll necks in a rolling mill.

2. Description of the Prior Art

In the typical rolling mill oil film bearing, as depicted somewhat diagrammatically in FIGS. 1 and 2, the roll 10 has a neck section 12. The neck section 12 may be conical, as shown in FIG. 1, or it may be cylindrical. A sleeve 14 is received on and fixed relative to the neck section 12. The exterior of the sleeve defines the journal surface 16 of the roll neck. A bushing 18 has an internal bearing surface 20 surrounding and rotatably supporting the journal surface 16. The bushing is contained by and fixed within a chock 22. The chock is closed at the outboard end by an end plate 24 and cover 26. A seal assembly 28 is provided between the roll and the inboard end of the chock 22.

During normal operation of the mill, when the roll is rotating at adequate speeds for full hydrodynamic operation, a continuous flow of oil is fed through one of the sets of passageways 29 in the chock, feed openings 30 in the bushing and rebores 32 in the bearing surface 20. From here, the oil enters between the bearing surface 20 and the rotating journal surface 16 to form a hydrodynamically-maintained somewhat wedge-shaped oil film 34 at the bearing load zone "Z". The load zone is located on the side opposite to that of the load "L" being applied to the roll, and the pressure profile at the load zone is schematically depicted in FIG. 1 at "P".

Although not shown, it will be understood that in most cases conventional hydrostatic means are employed to create the necessary oil film between the journal and bearing surfaces when the roll is either not rotating or rotating at a speed slower than that required to create and maintain the hydrodynamic oil film 34.

Oil is continuously drained from between the journal and bearing surfaces 16,20 at both the inboard and outboard ends of the load zone. The oil draining from the inboard end enters an inboard sump 36 enclosed by the seal assembly 28 and the adjacent surfaces of the chock, bushing and roll. Oil draining from the outboard end enters an outboard sump 38 enclosed by the end plate 24 and chock 22. The sumps 36,38 are interconnected by one or more passageways 40 drilled through the chock, and the outboard sump 38 is connected to a conventional lubrication system (not shown) which filters, cools and recirculates the oil back to the bearing for reintroduction between the bearing and journal surfaces 16,20.

It is to be understood that as herein employed, the term "oil" is to be interpreted broadly to include all classes of lubricants employed in bearings of the type under consideration, including for example mineral oil, synthetic oils and mixtures of oils and oil additives.

One of the objectives of the present invention is to achieve an increase in the stiffness of the above-described oil film bearing. As herein employed, the term "stiffness" means the ability of the bearing to resist movement of the journal surface 16 relative to the bearing surface 20 in response to the application of the load L to the roll.

Another objective of the present invention is to reduce operating temperatures by increasing the volume of oil flowing through the bearing. A companion objective is to achieve a reduction in the volume of oil draining into the inboard sump 36, thereby lessening the possibility of oil being lost through the seal assembly 28 as it undergoes normal wear.

Still another objective of the present invention is to improve the ability of the bushing and chock to self-align themselves with respect to the journal surface of the sleeve as the roll undergoes deflection during loading.

SUMMARY OF THE INVENTION

The foregoing objectives and advantages are achieved by employing a novel bushing and bearing assembly adapted to interrupt the load carrying continuity of the hydrodynamically maintained oil film in a manner which causes the load zone to be axially subdivided into compound pressure zones. The maximum pressure developed at each compound pressure zone is greater than that of the conventional unitary pressure zone Z shown in FIG. 1, with the result that the overall stiffness of the bearing is increased.

In a preferred embodiment of the invention to be described hereinafter in greater detail, the bushing has two wall sections defining cylindrical axially aligned internal bearing surfaces on which portions of the hydrodynamically maintained oil film are carried at the load zone. Oil is supplied continuously to the load zone via inlet means including feed openings in each of the internal bearing surfaces, and is removed continuously from opposite ends of the load zone as well as via outlet means axially interposed between the internal bearing surfaces. The feed openings and the outlet means are isolated one from the other by intervening portions of the cylindrical internal bearing surfaces.

The outlet means preferably includes an axial space between the internal bearing surfaces. Preferably the two wall sections of the bushing are integrally joined by an intermediate web of reduced thickness to provide a unitary wall component, and the axial space between the internal bearing surfaces is constituted by a groove on the interior of the wall component.

Alternatively, the two wall sections may be separate one from the other, with the axial space between the internal bearing surfaces constituting part of an axial separation therebetween.

In order to maintain a higher maximum pressure at each of the compound pressure zones, the volume of oil flowing through the bearing is increased. This increased oil flow removes more heat from the bearing and thus produces a beneficial lowering of operating temperatures.

Preferably, the oil being removed from the load zone by the outlet means is drained back through the bearing chock to the outboard bearing sump. This lessens the amount of oil draining into the inboard bearing sump, and thus decreases the possibility of oil being lost through the neck seal as it undergoes normal wear.

The outlet means is preferably located at the bearing center, thereby subdividing the load zone into two identical compound pressure zones. The identical compound pressure zones create counteracting moments axially spaced equal distances from the bearing center, thereby enhancing the self-alignment capabilities of the bearing. Alternatively, the outlet means may be located off-center to provide unequal pressure zones designed to exert a resultant moment in opposition to external bending forces being applied to the roll.

DETAILED DESCRIPTION OF THE INVENTION

Figure 1:
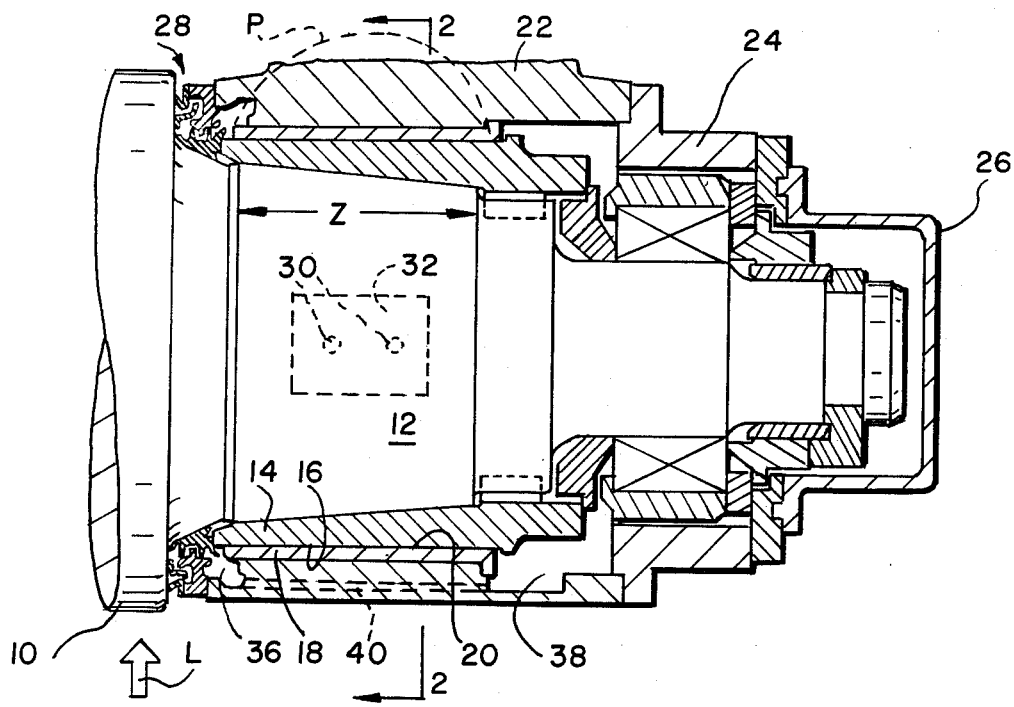
FIG. 1 is a somewhat schematic longitudinal sectional view taken through a conventional rolling mill oil film bearing.
Figure 2:
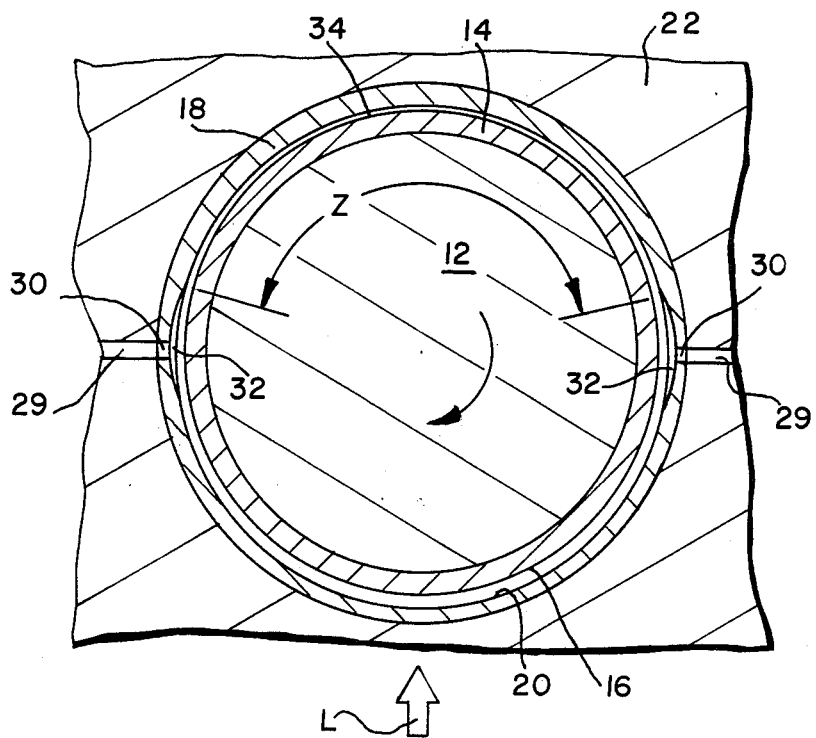
FIG. 2 is a cross sectional view on an enlarged scale taken alone line 2—2 of FIG. 1, with the clearance between the journal and bearing surfaces exaggerated for purposes of illustration.

Preferred embodiments of a bushing and bearing assembly in accordance with the present invention are depicted in FIGS. 3–7, where features common to those of the prior art bearing assembly of FIGS. 1 and 2 have been identified by the same reference numerals. The bushing 50 includes two wall sections 50a, 50b defining cylindrical axially aligned internal bearing surfaces 20a, 20b on which portions of the hydrodynamically maintained oil film are carried at the bearing load zone. As shown in FIG. 4B, oil is admitted between the journal 16 and the bearing surface 20b via inlet means comprising one of the two sets of passageways 29 in the chock, feed openings 30 extending through the bushing wall section 50b, and rebores 32 in the bearing surface 20b. Although not shown, it will be understood that identical sets of passageways 29, feed openings 30 and rebores 32 are associated with the bearing surface 20a.

As with the prior art design, oil is removed from the ends of the load zone directly into the inboard and outboard sumps 36, 38. Additionally, however, oil also is removed from the load zone via an outlet means located between the internal bearing surfaces 20a, 20b. In the bushing embodiment illustrated in FIGS. 3–5, the two wall sections 50a, 50b are integrally joined by an intermediate web 50c, and the outlet means includes groove 52 in the web defining an axial space "s" between the internal bearing surfaces 20a, 20b.

Each of the feed openings 30 and rebores 32 is isolated from the groove 52 by intervening portions 20a', 20b' of the internal bearing surfaces, thus preventing the incoming oil from escaping directly to the groove 52 without first being directed to the load zone.

Figure 4B:
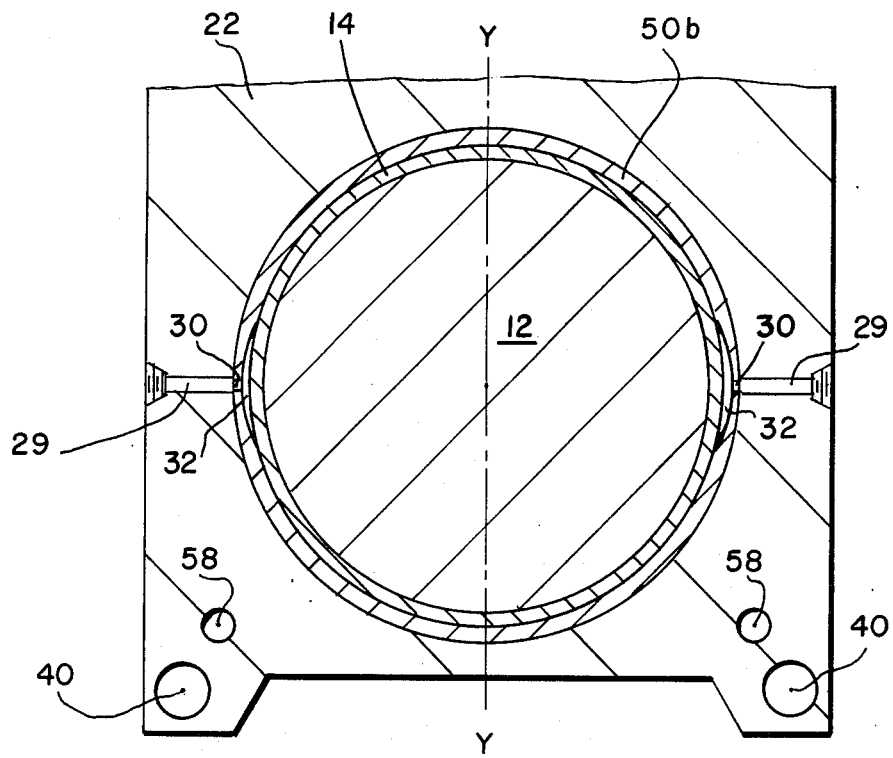
FIGS. 4A and 4B are cross sectional views on an enlarged scale taken along lines 4A—4A and 4B—4B of FIG. 3, again with certain dimensions exaggerated for purposes of illustration.
Figure 4A:
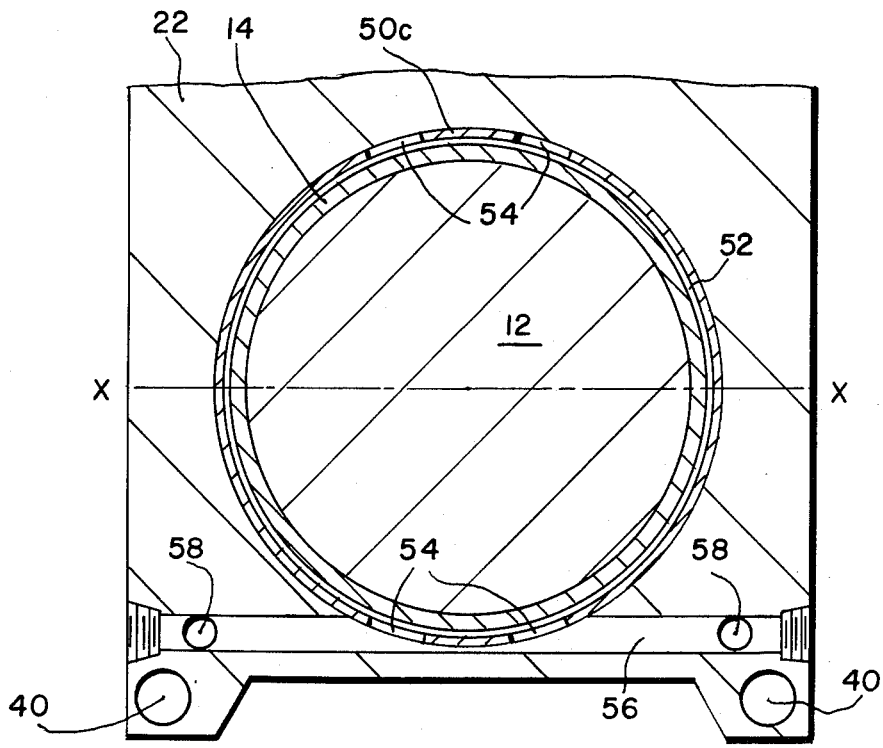
Figure 5:
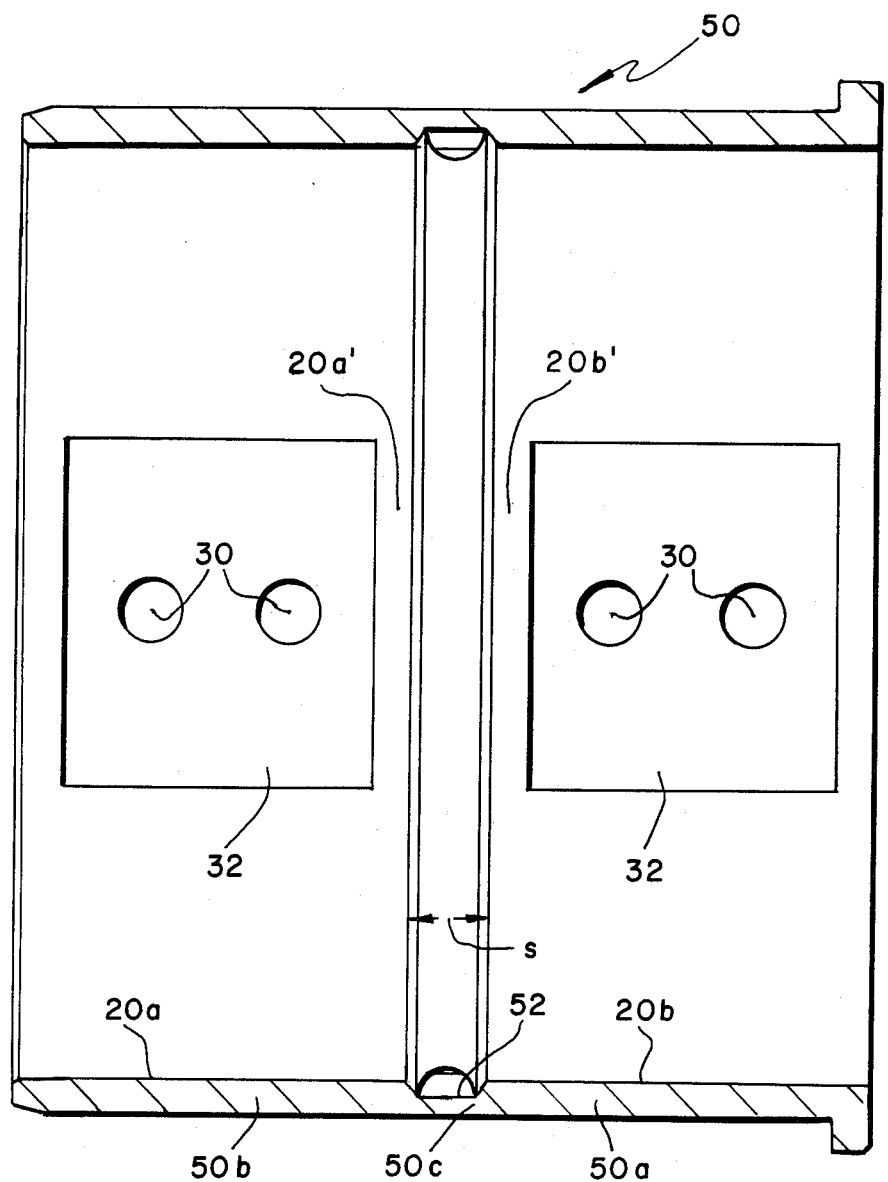
FIG. 5 is a longitudinal sectional view taken through the bushing shown in FIGS. 3 and 4.

As can be best seen in FIG. 4A, the web 50c has drain openings 54 communicating with a cross bore 56 in the chock 22. The cross bore 56 is connected via passageways 58 to the outboard sump 38.

Figure 3:
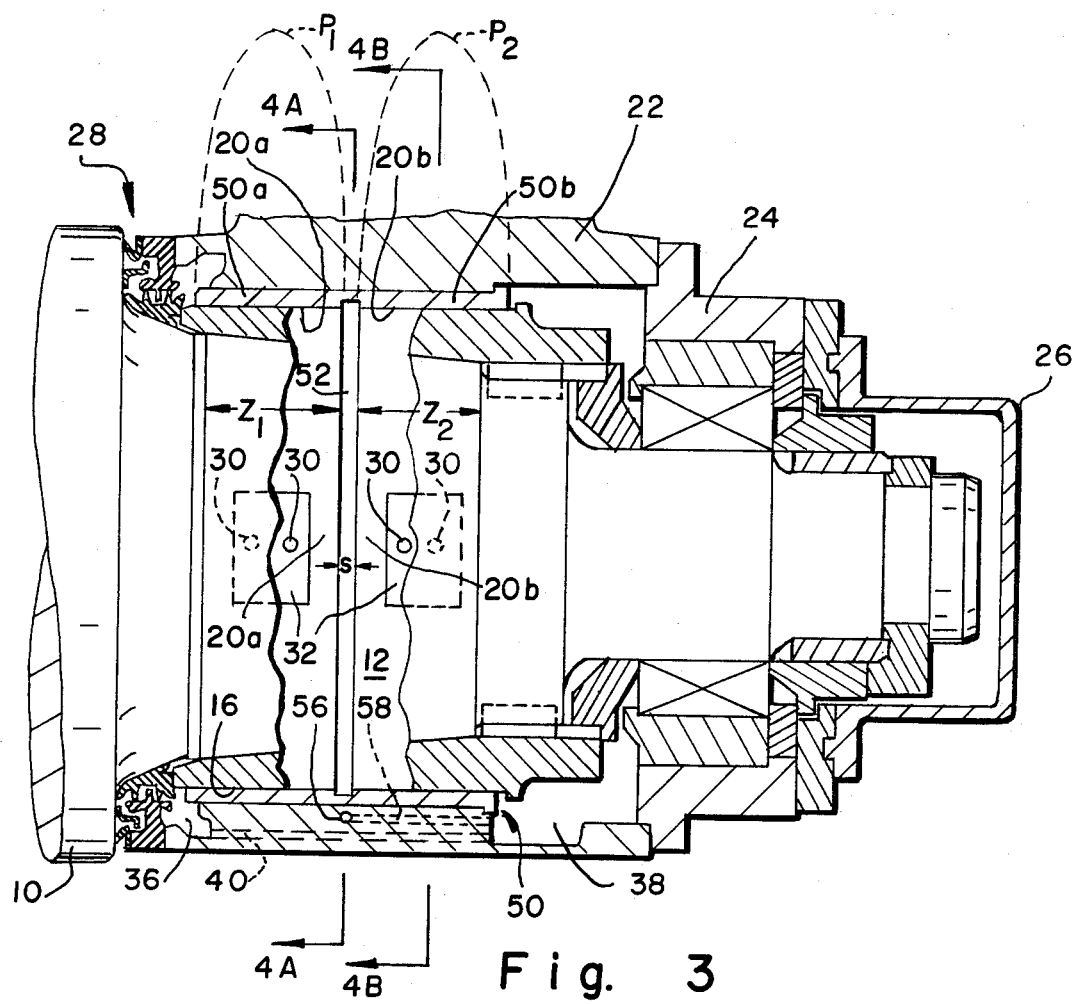
FIG. 3 is another somewhat schematic longitudinal sectional view taken through a rolling mill oil film bearing assembly and bushing in accordance with the present invention.
Figure 6:
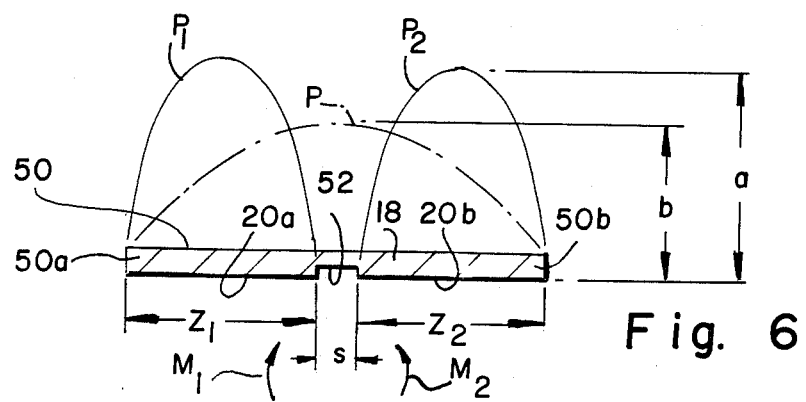
FIG. 6 is a schematic illustration comparing the pressure profiles of the compound pressure zones of a bushing in accordance with the present invention with the pressure profile of the unitary pressure zone of a conventional bushing.

The groove 52 axially subdivides the load zone into compound zones $z_1, z_2$, each respectively having pressure profiles schematically depicted at "$p_1$" and "$p_2$" in FIGS. 3 and 6. As shown in FIG. 6, the maximum pressure "a" developed in each pressure zone $z_1$, $z_2$ is greater than the maximum pressure "b" developed in the conventional undivided load zone Z. This produces a beneficial increase in bearing stiffness.

Again as shown in FIG. 6, the twin pressure profiles $p_1$, $p_2$ produce equal opposing moments $M_1$, $M_2$ which act on opposite sides of the bearing center to improve the self-aligning capabilities of the bearing.

In order to maintain these higher pressures, the volume of oil flowing through the bearing must be increased by as much as 20% as compared to the oil flow through a comparable conventional bearing. This increased oil flow removes more heat from the bearing and thus produces significantly lower operating temperatures.

Oil is continuously drained from both pressure zones $z_1$, $z_2$ into the groove 52. From here, the oil progresses through the drain openings 54, cross bore 56 and passageways 58 back to the outboard sump 38, which also receives oil from the outboard end of pressure zone $z_2$. In addition, oil draining from the inboard end of pressure zone $z_1$ into the inboard sump 36 also is directed back to the outboard sump 38 via passageways conduits 40.

With this arrangement, although total oil flow through the bearing is increased, the amount of oil being drained into the inboard sump 36 is actually decreased by approximately 40%. Thus, potential oil loss occasioned by wear of the seal assembly 28 is significantly minimized.

As can be best seen in FIGS. 4A and 4B, the groove 52 preferably extends a full 360° around the bushing axis, with alternatively usable sets of drain openings 54 located on opposite sides of a horizontal reference plane "x—x", and with alternatively usable sets of inlet openings 30 and rebores 32 located on opposite sides of a vertical reference plane "Y—Y". This allows the bushing to be rotated 180° after one side has become worn.

In light of the foregoing, it will now be appreciated by those skilled in the art that various changes and modifications may be made to the foregoing without departing from the basic concepts of the invention. For example, the disruption in the load carrying continuity of the hydrodynamically maintained oil film might be achieved by locating the groove in the journal surface 16 rather than in the bearing surface 20 as herein illustrated. More than one groove might be employed to axially subdivide the bearing into more than two pressure zones.

Also, the groove need not be located at the bearing center. In some cases, it might be advantageous to locate the groove slightly off-center to unbalance the resulting moments $M_1$, $M_2$ and thereby create a resultant moment tending to oppose external bending forces being applied to the roll.

Figure 7:
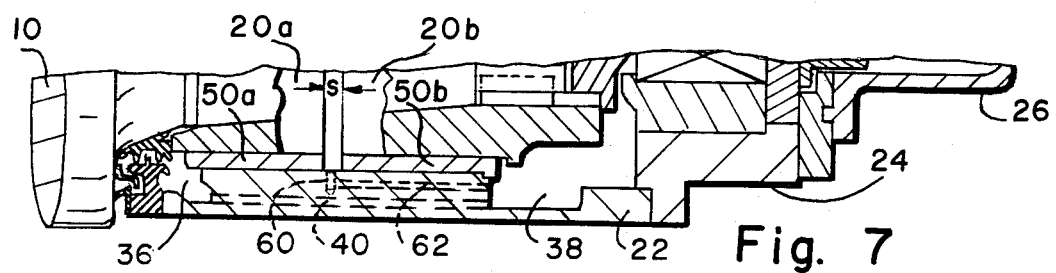
FIG. 7 is a partial longitudinal sectional view of another bearing embodying an alternate embodiment of a bushing in accordance with the present invention.

As shown in FIG. 7, the spacing "s" between bearing surfaces 20a, 20b might be achieved by physically separating the two wall sections 50a, 50b, and by draining oil from the load zone via radial passage 60 and connecting passage 62 leading to the outboard sump 38.

We claim:

1. A bushing for use in a hydrodynamic bearing assembly of the type employed to rotatably support a journal surface at one end of a roll in a rolling mill, said bushing comprising:

wall means for defining a pair of axially aligned cylindrical internal bearing surfaces adapted to surround said journal surface;

inlet means for admitting a continuous flow of a lubricant to said bearing surfaces, said inlet means extending through said wall means to feed opening interrupting the continuity of said bearing surfaces at locations which allow the thus admitted lubricant to be hydrodynamically formed by the rotary motion of the journal surface relative to said bearing surfaces into a lubricant film on which the journal surface is carried at a load zone on one side of the bearing assembly, said feed openings being arranged angularly outside of said load zone; and outlet means for continuously removing lubricant from said load zone, said outlet means being axially interposed between said bearing surfaces at said load zone and being operative to interrupt and axially subdivide said hydrodynamic film into separate portions, each portion being carried on one of said bearing surfaces, said outlet means being isolated from said feed openings by intervening portions of said bearing surfaces.

2. The bushing of claim 1 wherein said outlet means includes means defining an axial space between said internal bearing surfaces at the load zone.

3. The bushing of claim 2 wherein said wall means includes bushing wall sections which are integrally joined to provide a unitary wall component, and wherein the means for defining an axial space between said internal bearing surfaces is constituted by a groove on the interior of said wall component.

4. The bushing of claim 3 wherein said outlet means is further comprised by drain openings communicating with said groove and extending radially outwardly therefrom through said wall means to the exterior thereof.

5. The bushing of claim 2 wherein said wall means includes bushing wall sections which are separate one from the other, and wherein said axial space constitutes part of an axial separation between adjacent ends of said wall sections.

6. The bushing of claims 2, 3, 5 or 4 wherein said feed openings are arranged on opposite sides of a vertical reference plane containing the bushing axis and bisecting the bushing, and wherein said axial space extends 360° around the bushing axis.

7. The bushing of claim 3 wherein said feed openings are arranged on opposite sides of a vertical reference plane containing the bushing axis and bisecting said bushing, wherein said groove extends 360° around the bushing axis, and wherein said outlet means further comprises drain openings communicating with said groove and extending radially outwardly therefrom through said wall means to the exterior thereof, said drain openings being located on opposite sides of a horizontal reference plane containing the bushing axis and also bisecting said bushing.

8. An oil film bearing for a rotating roll neck in a rolling mill, said bearing comprising:

means defining a journal surface of the roll neck;

a bushing having a cylindrical internal bearing surface surrounding said journal surface, said bushing being contained by and fixed within a bearing chock;

inlet means including feed openings in said internal bearing surface for introducing a continuous flow of oil between said journal surface and said bearing surface, said feed openings being arranged to interrupt the continuity of said internal bearing surface at locations which allow the thus introduced oil to be formed hydrodynamically by the rotary motion of said journal surface relative to said bearing surface into an oil film on which the journal surface is carried at a load zone on one side of the bearing, said feed openings being arranged angularly outside of said load zone; and;

outlet means for continuously removing oil from said load zone at a location intermediate to the ends of said bushing, thereby providing an interruption in the load carrying continuity of the hydrodynamically formed oil film and separating said load zone into compound pressure means, said outlet means being isolated from said feed openings by intervening portions of said internal bearing surface.

9. The oil film bearing of claim 8 wherein the bearing load zone is subdivided by said outlet means into two pressure zones.

10. The oil film bearing of claim 9 wherein said two pressure zones are of equal axial length.

11. The oil film bearing of claim 9 wherein said two pressure zones are of unequal axial length.

12. The oil film bearing of claim 8 wherein said outlet means includes at least one circular groove in said bearing surface.

13. The oil film bearing of claim 12 wherein said circular groove is located axially at the middle of said bearing surface to thereby subdivide said load zone into two identical pressure zones.

14. The oil film bearing of claim 8 further comprising means for defining inboard and outboard sumps for receiving oil from the inboard and outboard ends, respectively, of said load zone, and means for connecting said outlet means to said outboard sump.

15. An oil film bearing assembly for rotatably supporting a roll neck in a rolling mill, said bearing assembly comprising:

a bearing chock;

a bushing fixed within the bearing chock and having an inner cylindrical bearing surface, the combination of said chock and bushing being adapted to be received on the roll neck, with the bearing surface of said bushing surrounding a journal surface of the said neck;

inlet means for admitting a continuous flow of oil between said bearing surface and said journal surface, said inlet means extending through said bushing to feed openings interrupting the continuity of said bearing surface at locations which allow the thus admitted oil to be formed hydrodynamically by the rotary motion of said journal surface relative to said bearing surface into an oil film on which the journal surface is carried at a load zone on one side of the bearing assembly, said feed openings being arranged angularly outside of said load zone;

outlet means for continuously removing oil from said load zone, said outlet means being axially interposed between the ends of said bushing and including a circular groove in said bearing surface, said groove being operative to interrupt said oil film and to subdivide said load zone into inboard and outboard pressure zones, said groove being separated from said feed openings by intervening portions of said bearing surface;

a seal assembly at the inboard end of said chock, said seal assembly being adapted to cooperate in sealing engagement with said chock and said roll neck to define a first sump into which oil is continuously drained from said inboard pressure zone;

a cover assembly cooperating with the outboard end of said chock to define a second sump into which oil is continuously drained from said outboard pressure zone; and conduit means communicating with said groove and said second sump for continuously draining oil from said first and second pressure zones via said groove into said second sump.

* * * * *